United States Patent
Yesugade et al.

(10) Patent No.: US 9,607,210 B2
(45) Date of Patent: Mar. 28, 2017

(54) VIDEO SURVEILLANCE SYSTEM AND METHOD FOR FRAUD DETECTION

(71) Applicant: Tata Consultancy Services Limited, Mumbai, Maharashtra (IN)

(72) Inventors: Snehal Yesugade, Karnataka (IN); Apurba Das, Karnataka (IN); Palak Dave, Karnataka (IN); Srinkhala Srivastava, Karnataka (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/919,800

(22) Filed: Oct. 22, 2015

(65) Prior Publication Data

US 2016/0180149 A1    Jun. 23, 2016

(30) Foreign Application Priority Data

Dec. 19, 2014   (IN) .......................... 4101/MUM/2014

(51) Int. Cl.
*G06K 9/00* (2006.01)
*G06T 7/20* (2017.01)
*G06K 9/46* (2006.01)

(52) U.S. Cl.
CPC ..... *G06K 9/00281* (2013.01); *G06K 9/00248* (2013.01); *G06K 9/00771* (2013.01); *G06K 9/4642* (2013.01); *G06K 9/4661* (2013.01); *G06T 7/20* (2013.01); *G06T 7/2053* (2013.01); *G06K 2009/4666* (2013.01); *G06T 2207/30201* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

| | | |
|---|---|---|
| 7,409,091 B2 | 8/2008 | Sung et al. |
| 8,265,349 B2 | 9/2012 | Wang et al. |
| 9,088,661 B2 | 7/2015 | Surty et al. |

(Continued)

OTHER PUBLICATIONS

Cheng-Chin Chiang, A novel method for detecting lips,eyes and faces in real time, Real-Time Imaging, 2003, 277-287, 9, Elsevier Ltd., Taiwan.

*Primary Examiner* — Shervin Nakhjavan
(74) *Attorney, Agent, or Firm* — Thompson Hine LLP (57) ABSTRACT

Disclosed is a method and video surveillance system for detecting fraud. The system may receive images. The system may convert the images into binary images. Subsequently, the system may identify a reference frame amongst the binary images. The system may trigger face detection upon detecting motion within the binary images. The system may detect the motion based on a relative white pixel count of the binary image with respect to a reference image. The system may reduce a Region of Interest (RoI) window within the binary images based on a highest density of white pixel count. The system may determine whether a face is detected within the reduced RoI window. The system may determine whether mouth is detected within a lower half of the face when the face is detected. The system may detect the fraud when the face is not detected or the mouth is not detected.

19 Claims, 8 Drawing Sheets

(56) References Cited

U.S. PATENT DOCUMENTS

| | | | |
|---|---|---|---|
| 2001/0014182 A1* | 8/2001 | Funayama | G06T 7/0081 382/282 |
| 2003/0189654 A1* | 10/2003 | Kage | G06T 13/40 348/239 |
| 2007/0019842 A1* | 1/2007 | Kang | G06K 9/00604 382/117 |
| 2008/0137957 A1* | 6/2008 | Xu | G06K 9/00261 382/190 |
| 2008/0166052 A1* | 7/2008 | Hatano | G06K 9/00221 382/190 |
| 2011/0075933 A1* | 3/2011 | Hong | G06K 9/00228 382/190 |

\* cited by examiner

VIDEO SURVEILLANCE SYSTEM AND METHOD FOR FRAUD DETECTION

CROSS-REFERENCE TO RELATED APPLICATIONS AND PRIORITY

The present application claims priority from Indian patent application 4101/MUM/2014 filed on Dec. 19, 2014, the entirety of which is incorporated by reference.

TECHNICAL FIELD

The present subject matter described herein, in general, relates to fraud detection by a video surveillance system.

BACKGROUND

Conventional techniques of video surveillance systems, which involve face detection recognition, use a face detection algorithm that works continuously for detecting a face in an image. The face detection algorithm works on all images present in a video recorded by an image sensor. The image sensor may be a camera, an infrared sensor, or a thermal sensor, or any other device known in the art for capturing images. Continuous monitoring of the images for face detection consumes a lot of memory and processing time. Further, the face detection algorithm may falsely detect a face from a background of the image. This may lead to non-identification of an intended user or false detection of an unintended subject. The face detection algorithm may be used for processing video stream captured by a video surveillance system. Further, the face detection algorithm may be used for detecting faces of different persons present in the video stream.

For an example, an Automatic Telling Machine (ATM) widely makes use of the face detection algorithm for detecting a user accessing the ATM. The user accessing the ATM may cover a part of his face while attempting a deceitful action. For an example, the user may cover his mouth for making a false detection by the ATM. During such a situation, the face detection algorithm may falsely detect the user based on eyes of the user.

SUMMARY

This summary is provided to introduce aspects related to a video surveillance system and method for fraud detection and the aspects are further described below in the detailed description. This summary is not intended to identify essential features of the claimed subject matter nor is it intended for use in determining or limiting the scope of the claimed subject matter.

In one implementation, a method for fraud detection by a video surveillance system is disclosed. The method may include receiving a plurality of images, by a processor in the video surveillance system. The method may further include converting the plurality of images, present at a predefined frame interval, into binary images by the processor. The plurality of images may be converted into the binary images using a Figure Ground Segregation (FGS) technique. The method may further include identifying a reference frame, from the binary images, having a relative white pixel count greater than a lower predefined threshold of the white pixel count, by the processor. The method may include performing an Exclusive-OR (XOR) operation, by the processor, between the binary images, present at the predefined frame interval, to determine the relative white pixel count. The method may also include triggering face detection upon detecting motion within the binary images by the processor. The motion may be detected while the relative white pixel count either exceeds an upper predefined threshold or increases monotonically. The method may also include reducing a Region of Interest (RoI) window within the binary images, by the processor, based on a highest density of white pixel count. The highest density of white pixel count may be determined by spatially sampling the binary images along columns. The method may further include determining whether a face is detected, by the processor, within the reduced RoI window. The method may include determining whether mouth is detected within a lower half of the face, by the processor, when the face is detected within the reduced RoI window. The method may further include detecting the fraud, by the processor, when the face is not detected within the reduced RoI window and/or the mouth is not detected within the lower half of the detected face.

In one implementation, a system for fraud detection is disclosed. The system includes a processor and a memory coupled to the processor for executing programmed instructions stored in the memory. The processor may receive a plurality of images. The processor may further convert the plurality of images, present at a predefined frame interval, into binary images. The system may convert the plurality of images into the binary images using a Figure Ground Segregation (FGS) technique. The processor may further identify a reference frame, from the binary images, having a relative white pixel count greater than a lower predefined threshold of the white pixel count. The processor may perform an Exclusive-OR (XOR) operation between the binary images, present at the predefined frame interval, to determine the relative white pixel count. The processor may further trigger face detection upon detecting motion within the binary images. The motion may be detected while the relative white pixel count either exceeds an upper predefined threshold or increases monotonically. The processor may further reduce Region of Interest (RoI) window within the binary images based on a highest density of white pixel count. The highest density of white pixel count may be determined by spatially sampling the binary images along columns. The processor may further determine whether a face is detected within the reduced RoI window. The processor may determine whether mouth is detected within a lower half of the face when the face is detected within the reduced RoI window. The processor may further detect the fraud when the face is not detected within the reduced RoI window and/or the mouth is not detected within the lower half of the detected face.

In one implementation, a non-transitory computer readable medium embodying a program executable in a computing device for fraud detection by a video surveillance system is disclosed. The program may include a program code for receiving a plurality of images. The program may further include a program code for converting the plurality of images, present at a predefined frame interval, into binary images. The plurality of images may be converted into the binary images using a Figure Ground Segregation (FGS) technique. The program may further include a program code for identifying a reference frame, from the binary images, having a relative white pixel count greater than a lower predefined threshold of the white pixel count. The program may further include a program code for performing an Exclusive-OR (XOR) operation between the binary images, present at the predefined frame interval, to determine the relative white pixel count. The program may further include a program code for triggering face detection upon detecting motion within the binary images. The motion may be detected while the relative white pixel count either exceeds an upper predefined threshold or increases monotonically. The program may further include a program code for reducing a Region of Interest (RoI) window within the binary images based on a highest density of white pixel count. The highest density of white pixel count may be determined by spatially sampling the binary images along columns. The program code may further include a program code for determining whether a face is detected within the reduced RoI window. The program code may further include a program code for determining whether mouth is detected within a lower half of the face when the face is detected within the reduced RoI window. The program code may further include a program code for detecting the fraud when the face is not detected within the reduced RoI window and/or the mouth is not detected within the lower half of the detected face.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Video surveillance system and method for fraud detection are described in the present subject matter. In one case, the video surveillance system may be implemented in an Automatic Teller Machine (ATM) and may henceforth be referred as a system. The system may receive a plurality of images captured by a camera of the ATM. The system may convert the plurality of images into binary images. The system may identify a reference frame from the binary images. The reference frame may have a relative white pixel count greater than a lower predefined threshold of the white pixel count. The system may trigger face detection upon detecting motion within the binary images. The system may detect the motion while the relative white pixel count either exceeds an upper predefined threshold or increases monotonically. The system may reduce a Region of Interest (RoI) window within the binary image based on a highest density of white pixel count. The system may determine whether a face is detected within the reduced RoI window. The system may determine whether mouth is detected within a lower half of the face when the face is detected within the reduced RoI window. The system may further detect the fraud when the face is not detected within the reduced RoI window and/or the mouth is not detected within the lower half of the detected face.

While aspects of described video surveillance system and method for fraud detection may be implemented in any number of different computing systems, environments, and/or configurations, the embodiments are described in the context of the following exemplary system.

Figure 1:
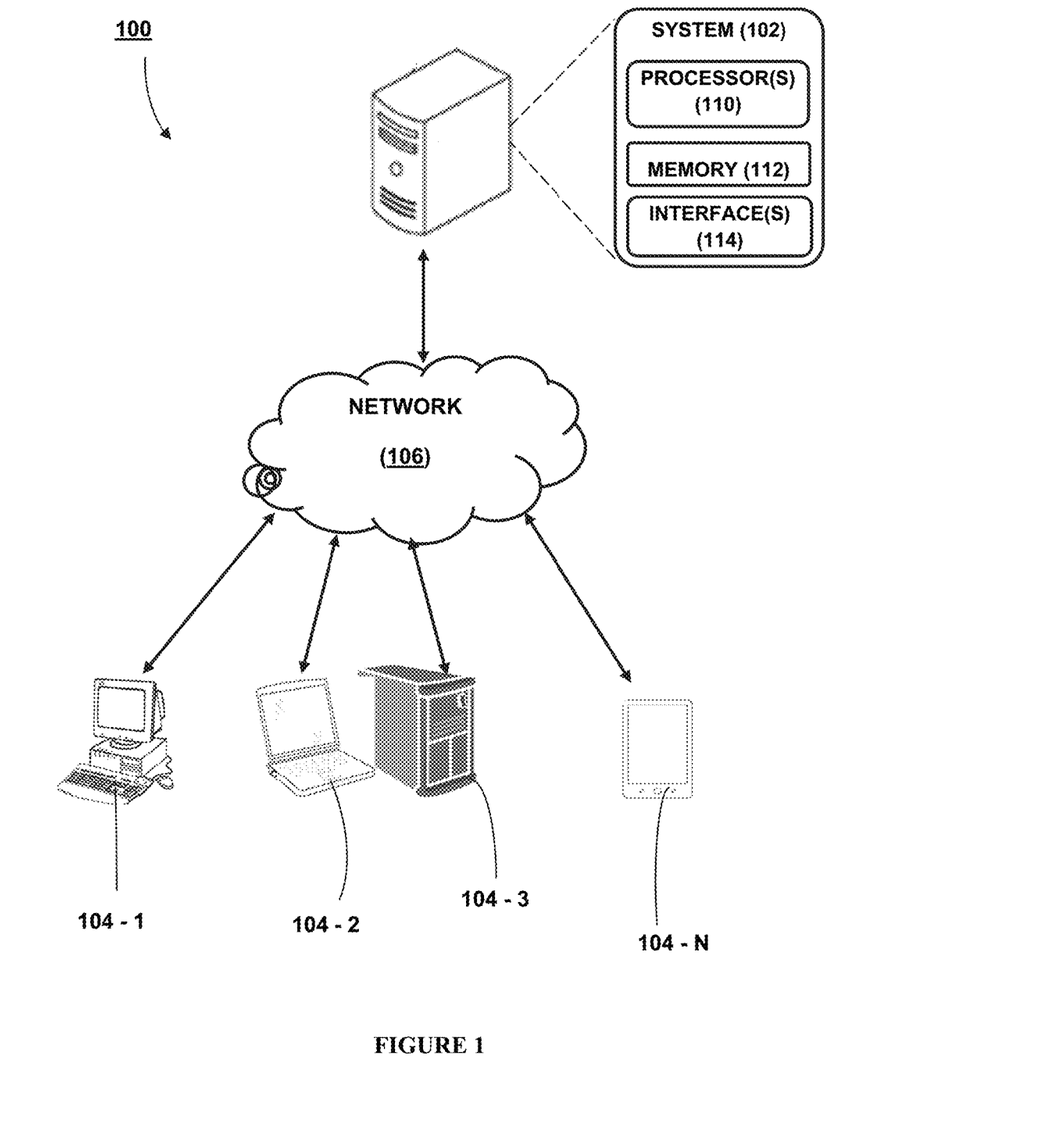
FIG. 1 illustrates a network implementation of a system for fraud detection, in accordance with an embodiment of the present subject matter.

Referring now to FIG. 1, a network implementation 100 of a system 102 for fraud detection is shown, in accordance with an embodiment of the present subject matter. Although the present subject matter is explained considering that the system 102 is implemented on a computer, it may be understood that the system 102 may also be implemented in a variety of computing systems including but not limited to, a smart phone, a tablet, a notepad, a personal digital assistant, a handheld device, a laptop computer, a notebook, a workstation, a mainframe computer, a server, and a network server. In one embodiment, the system 102 may be implemented in a cloud-based environment. It will be understood that the system 102 may be accessed by multiple users through one or more user devices 104-1, 104-2, 104-3, to 104-N, collectively referred to as user device 104 hereinafter, or applications residing on the user device 104. Examples of the user device 104 may include, but are not limited to, a portable computer, a personal digital assistant, a handheld device, and a digital camera. The user device 104 is communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, as illustrated using the FIG. 1, the system 102 may include at least one processor 110, a memory 112, and input/output (I/O) interfaces 114. Further, the at least one processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 112.

The I/O interfaces 114 may include a variety of software and hardware interfaces, for example, a web interface, a graphical user interface, and the like. The I/O interfaces 114 may allow the system 102 to interact with a user directly. Further, the I/O interfaces 114 may enable the system 102 to communicate with other computing devices, such as web servers and external data servers (not shown). The I/O interfaces 114 can facilitate multiple communications within a wide variety of networks and protocol types, including wired networks, for example, LAN, cable, etc., and wireless networks, such as WLAN, cellular, or satellite.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The video surveillance system may be implemented in banks, hospitals, shops, residential places and other relevant places. In one embodiment, the video surveillance system may be implemented in an Automatic Teller Machine (ATM). Referring to a flowchart 200 illustrated in FIG. 2, a process of triggering face detection is explained. The description is provided with reference to the steps mentioned in a flow chart 200 of FIG. 2. A camera connected to the ATM may capture a video of users handling an operating area of the ATM. The video may include a plurality of images, as shown at step 202. Thus, the system 102 may receive the plurality of images, captured by the camera. Subsequently, the system 102 may binarize the plurality of images i.e. convert the plurality of images into binary images, as shown at step 204. In one case, the system 102 may binarize the plurality of images using a Figure Ground Segregation (FGS) technique. In one case, the system 102 may use a Neuro-visually inspired Figure Ground Segregation (NFGS) for extracting maximum information while binarizing the plurality of images. The plurality of images binarized using NFGS may enable the system 102 in later identifying a face by using a HAAR technique. For example, the HAAR technique can identify a face on a gray image or a binarized image which is obtained by binarizing a gray image using NFGS.

Figure 2:
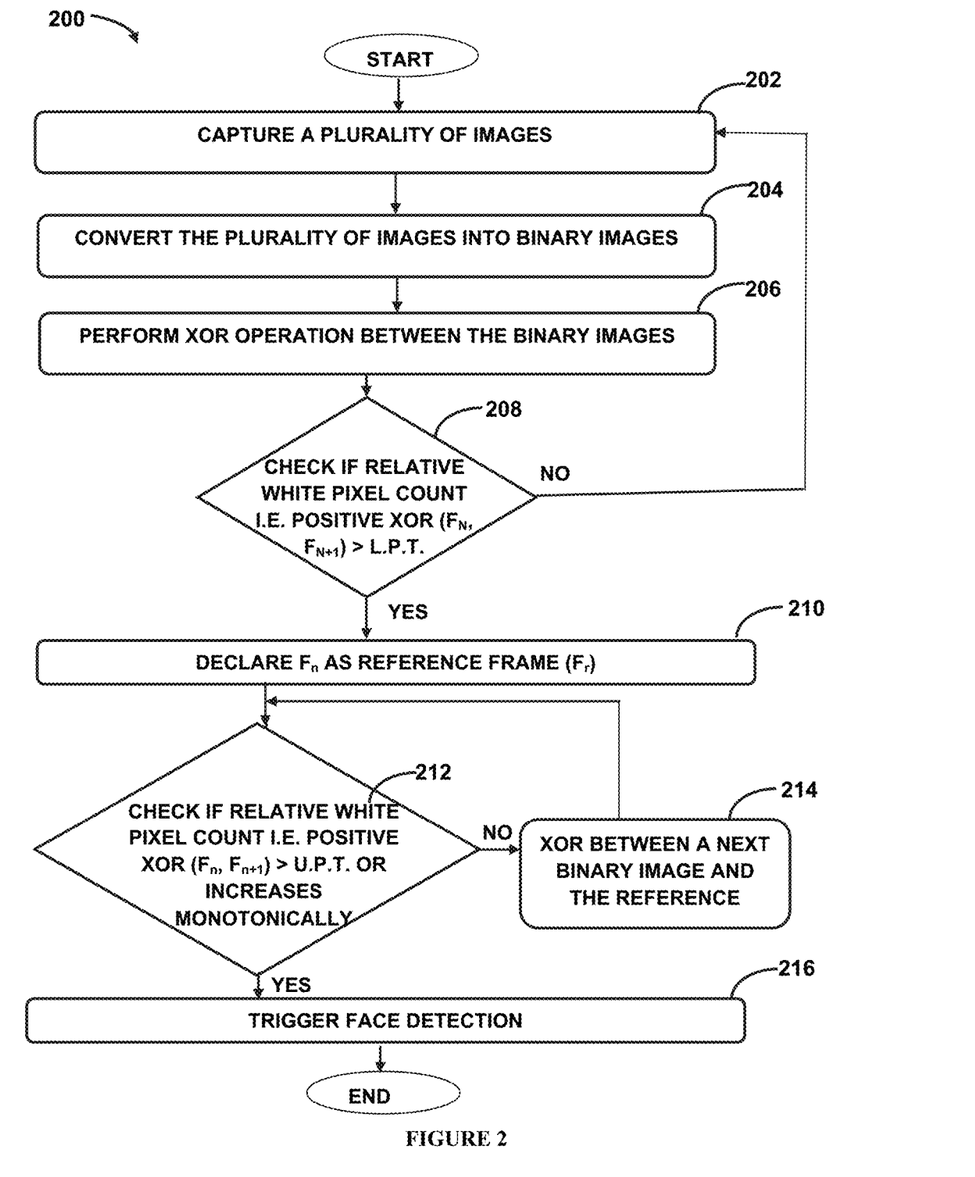
FIG. 2 illustrates a flowchart showing a process of triggering face detection, in accordance with an embodiment of the present subject matter.

In one embodiment, the system 102 may binarize the plurality of images at a low sampling rate. For an example, the system 102 may binarize the plurality of images at a sampling rate of 1 Frame per Second (FPS). Processing the plurality of images at a sampling rate of 1 FPS, before detection of a face, helps the system 102 to improve usage of the processor 110.

Subsequent to binarization of the plurality of images, the system 102 may perform an Exclusive-OR (XOR) operation between the binary images to determine a relative white pixel count, as shown at step 206. For example, a difference in pixel intensity (0 and 1 or 1 and 0) results in a white pixel. The relative white pixel count may be a white pixel count that is calculated with respect to total number of pixels in each frame. In one case, the XOR operation may be performed between the binary images present at a predefined frame interval. For an example, the predefined frame interval may include 30 frames in between two successive frames or images. Thus, the binary images selected for the XOR operation may be $1^{st}$, $31^{st}$, $61^{st}$, $91^{st}$ and the like. Thus, two successive images used in the XOR operation may be indicated as $F_n$ and $F_{n+1}$. The system 102 may use the relative white pixel count to identify a reference frame, from the binary images. The system 102 may identify the reference frame having the relative white pixel count greater than a lower predefined threshold (L.P.T.) of the white pixel count. Thus, the system 102 may check if the relative white pixel count i.e. positive XOR between $F_n$ and $F_{n+1}$ exceeds the L.P.T, as shown at step 208. If the relative white pixel count does not exceed the L.P.T., the system 102 may move back to step 202 to start capturing the plurality of images. When the relative white pixel count exceeds the L.P.T., the system 102 may perform step 210 and may declare the image $F_n$ as the reference frame ($F_r$).

Post identifying the reference frame at step 210, the system 102 may detect motion within the binary images. The system 102 may detect motion by checking if the relative white pixel count i.e. the positive XOR between $F_n$ and $F_{n+1}$ either exceeds an Upper Predefined Threshold (U.P.T.) or increases monotonically, as shown at step 212. In case the condition at the step 212 does not stand true, the system 102 may perform an XOR operation between a next binary image and the reference image ($F_r$), as shown at step 214. Further, if the condition at the step 212 stands true, the system 102 may trigger face detection at step 216. Upon triggering face detection, the system 102 may increase the sampling rate of the binary images. In one case, the system 102 may increase rate of frame capture from 1 frame per second to 30 frames per second. In other words, all the frames are processed from the time of triggering the face detection.

Figure 3A:
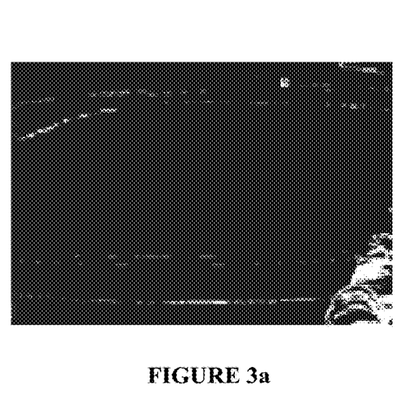
FIG. 3a, FIG. 3b, FIG. 3c, and FIG. 3d collectively show exemplary images illustrating a process of triggering face detection, in accordance with an embodiment of the present disclosure.
Figure 3B:
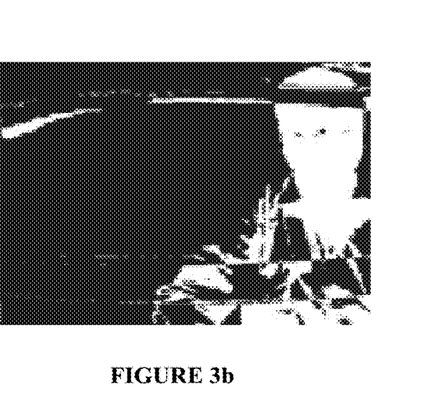
Figure 3C:
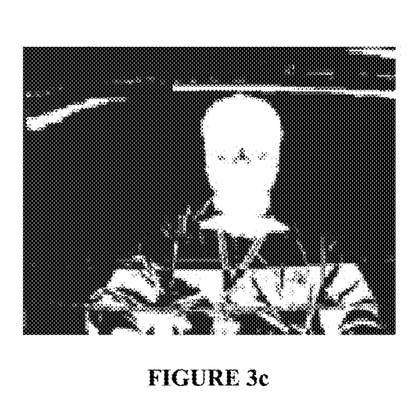
Figure 3D:
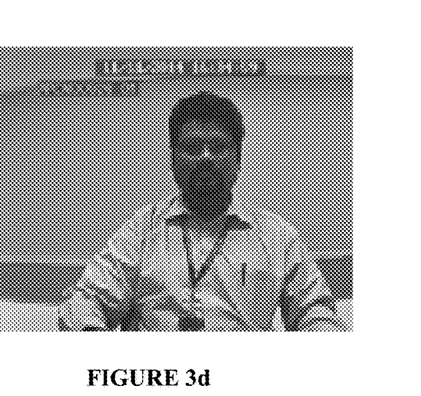

For an example, the process of triggering face detection is explained with reference to FIG. 3 collectively illustrating the triggering of the face detection. The system 102 may use a processing resolution of 1 FPS following triggering of face detection. FIG. 3*a* and FIG. 3*b* illustrates a person entering into an image frame. FIG. 3*c* shows the person entered into the image frame. In one case, the system 102 may process the binary images, as shown in the FIG. 3*b* and FIG. 3*c*. While the person is completely captured in the image frame, the system 102 may determine the relative white count having a value greater than the Upper Predefined Threshold of white count. The system 102 may then use the gray image of the person for face detection, as shown by FIG. 3*d*. Thus, the process of face detection may be triggered and the gray image may be used for further processing. Post triggering the face detection, the system 102 may increase the processing resolution of the images. For an example, the system 102 may increase the processing resolution to 30 FPS. Thus, the system 102 may use 30 frames in a second for detecting the face of the user.

Figure 4A:
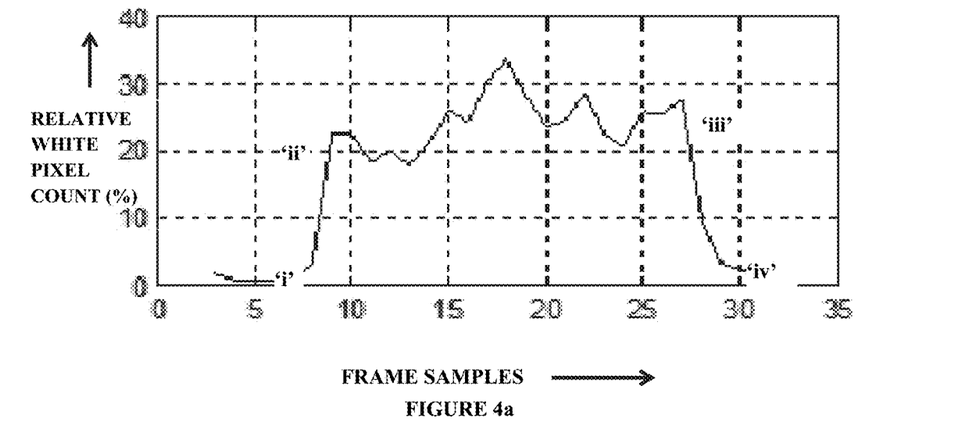
FIG. 4a illustrates a graph showing reference frame selection and stabilization characteristics during a normal workflow.

In one exemplary embodiment, referring to FIG. 4*a*, a graph showing reference frame selection and stabilization characteristics during a normal workflow is explained. X-axis of the FIG. 4*a* indicates frame samples and Y-axis indicates a percentage of the relative white pixel count. The FIG. 4*a* shows an increase in the relative white pixel count from region (i) to region (ii). The increase in the relative white pixel, illustrated by the region (i) to the region (ii), indicates the person entering in a Field of View (FoV), as illustrated by the FIGS. 3*a* and 3*b*. In one case, the system 102 may track stabilization of the relative white pixel count from region (ii) to region (iii), and may trigger the face detection. Stabilization of the relative white pixel count, from the region (ii) to the region (iii), indicates complete containment of the person in the FoV, as also illustrated by the FIG. 3c. In case the person moves out of the FoV, as indicated by region (iv) of the FIG. 4a, the system 102 may turn off the face detection.

Figure 4B:
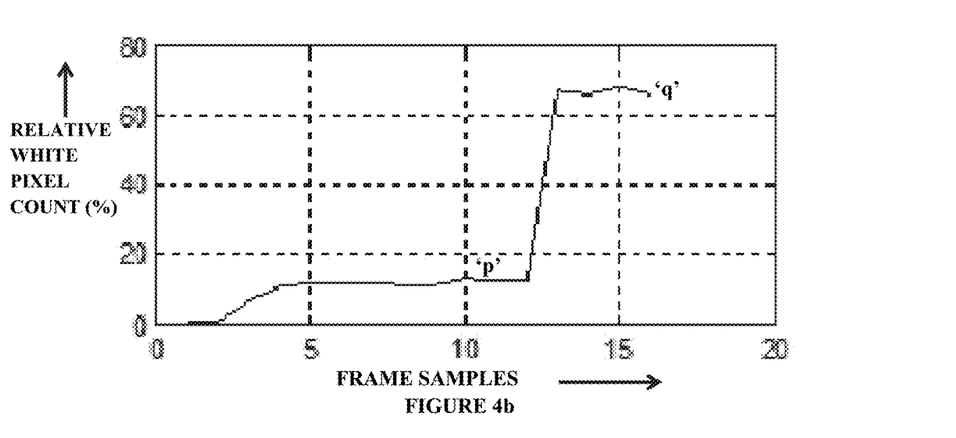
FIG. 4b illustrates a graph showing reference frame selection and stabilization characteristics during abrupt changes in illumination.

In one exemplary embodiment, referring to FIG. 4b, a graph showing reference frame selection and stabilization characteristics during abrupt changes in illumination. X-axis of the FIG. 4b indicates frame samples and Y-axis indicates a percentage of the relative white pixel count. The FIG. 4b shows an increase in the relative white pixel count from region 'p' to region 'q' while the illumination in the images increase. The system 102 may update the reference frame while the illumination changes. In one case, the system 102 may update the reference frame using a linear interpolation technique between a current image background and the reference frame.

Figure 5:
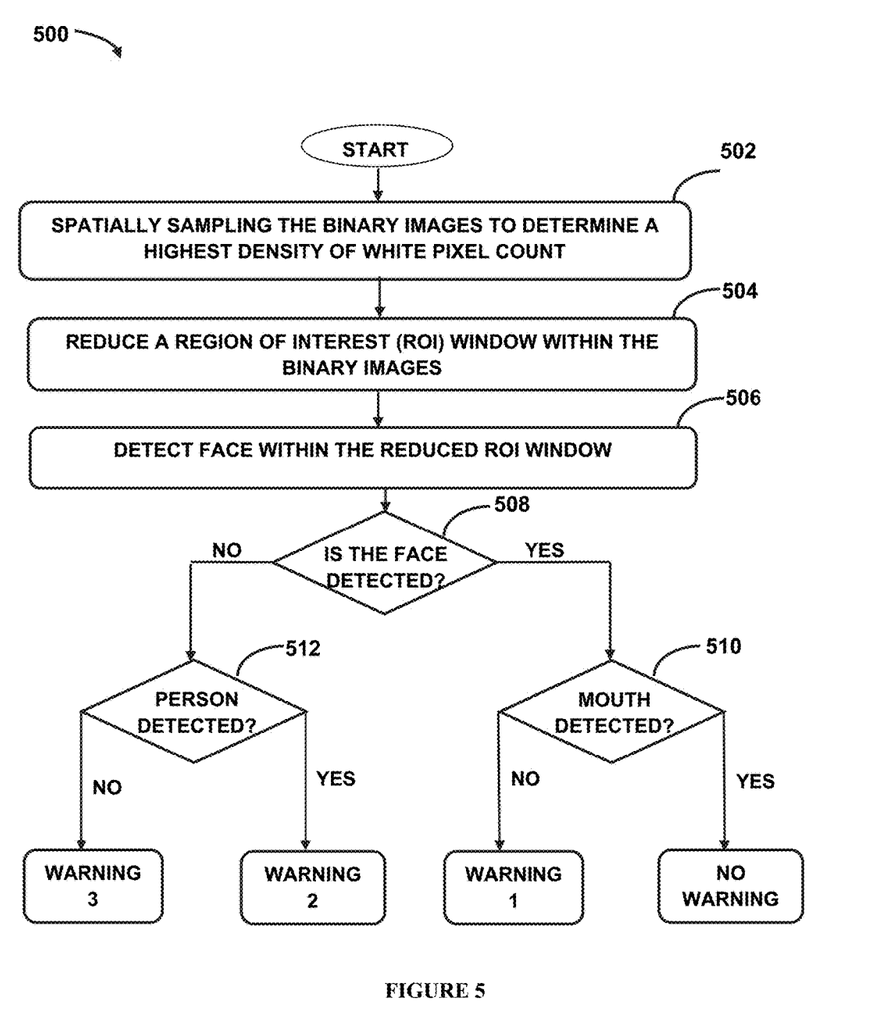
FIG. 5 illustrates a flowchart showing a process of generating warnings upon detection of fraud by a video surveillance system.

Referring to FIG. 5, a flowchart 500 showing a process of generating warnings upon detection of fraud by a video surveillance system is described. In one case, after face detection is triggered, the system 102 may spatially sample the binary images along columns to determine a highest density of white pixel count, at step 502. In another case, the system may spatially sample the binary images along rows for determining the highest density of white pixel count. Based on the highest density of white pixel count, the system 102 may reduce a Region of Interest (RoI) window within the binary images, at step 504. Subsequently, the system 102 may detect a face within the reduced RoI window, at step 506. In one case, the system 102 may detect the face using a HAAR technique.

Figure 6A:
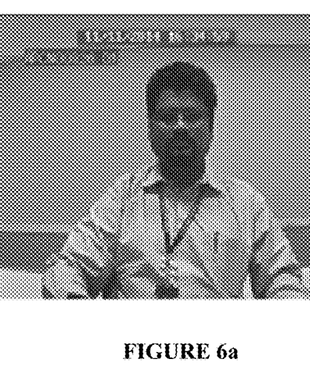
FIGS. 6a, 6b, 6c, and 6d collectively show images illustrating reducing a Region of Interest (RoI) window of gray images.
Figure 6B:
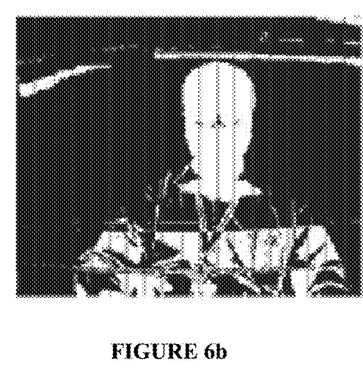
Figure 6C:
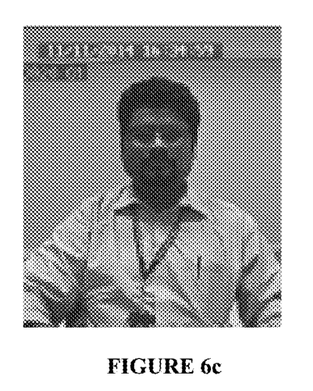
Figure 6D:
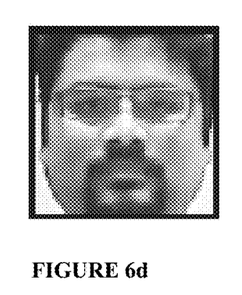
Figure 6E:
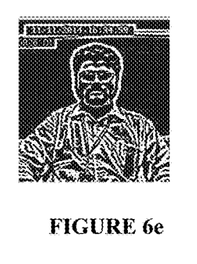
FIGS. 6e and 6f show images illustrating reducing a Region of Interest (RoI) window of binary images.
Figure 6F:
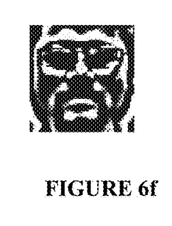

Referring to FIG. 6a, FIG. 6b, FIG. 6c, and FIG. 6d reducing or narrowing down the Region of Interest (RoI) window of gray image is explained. The FIG. 6a shows an exemplary gray image of a person to be used by the system 102 for detection of face. FIG. 6b shows a few samples captured from the gray image, along a Y-direction (along columns, i.e. vertically). The FIG. 6b shows a value of the relative white pixel count in the XORed image being greater than the upper predefined threshold of the white pixel count. FIG. 6c shows a reduced or narrowed RoI window of the gray image. Further, the system 102 may apply an image enhancement technique on the reduced RoI window of the image. In one case, the system 102 may use histogram equalization as the image enhancement technique. The FIG. 6d shows the face identified or detected from the reduced RoI window of the gray image. Further, the system may process the binary images for face identification, as illustrated by the FIG. 6e and FIG. 6f.

Figure 7A:
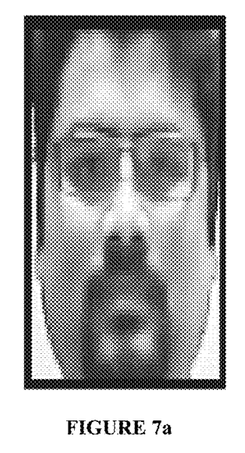
FIGS. 7a, 7b, and 7c show images illustrating detection of mouth from the reduced RoI window of the gray images.
Figure 7B:
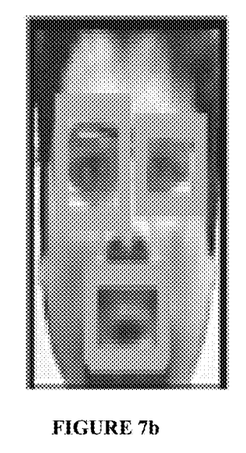
Figure 7C:
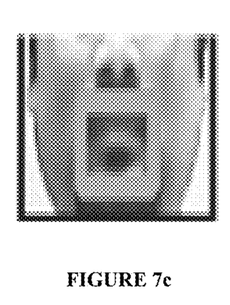
Figure 7D:
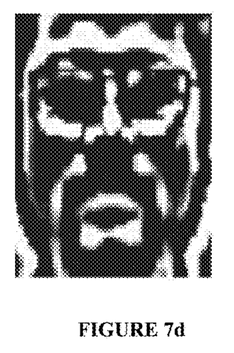
FIGS. 7d, 7e, and 7f show images illustrating detection of mouth from the reduced RoI window of the binary images.
Figure 7E:
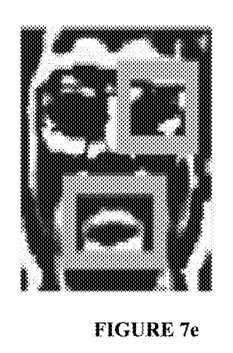
Figure 7F:
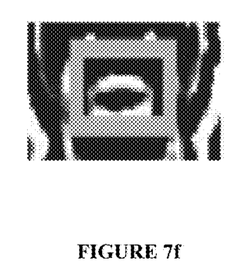

In one embodiment, when the face is detected within the reduced RoI window, at step 508, the system 102 may detect mouth in a lower half of the face, at step 510. In one case, the system 102 may detect the mouth using the HAAR technique. Referring to FIGS. 7a, 7b, and 7c gray images showing detection of mouth from the reduced RoI are illustrated. FIG. 7a illustrates the face detected by the system 102, from the reduced RoI window, at the step 506. FIG. 7b shows identification of the mouth from the face, by the system 102. FIG. 7b also shows false identification of the eyes as the mouth. Typically, the mouth detection techniques may erroneously identify either of the eyes as the mouth. Thus, to avoid such erroneous detection, the system 102 may use a lower half of the face for detecting the mouth, as illustrated from the FIG. 7c. Thus, the system 102 improves the process of fraud detection by identifying the mouth in the lower half of the face. Further, FIGS. 7d, 7e, and 7f show images illustrating detection of the mouth from reduced RoI window of the binary images, as explained above with reference to FIGS. 7a, 7b, and 7c.

In one embodiment, upon successful detection the mouth, at step 510, the system 102 may not generate any warning. In case of a failure to detect the mouth, it may indicate that the user has covered his mouth using a helmet or a scarf. Thus, the system 102 may generate a warning 1 to indicate of a fraudulence occurring in the ATM. Alternatively, when the system 102 fails to detect the face within the reduced RoI window, the system 102 may detect any person within the binary images, at step 512. In one case, the system 102 may use a Histogram of Oriented Gradients (HOG) technique for detecting the person within the gray images, upon detecting motion in the binary images. In one case when the system 102 detects the person within the gray images and when the face is undetected, the system 102 may identify or detect the fraud within the ATM and thus issues a warning 2. During another case, when the system 102 fails to identify any person within the gray images, the system 102 may generate a warning 3 which may indicate of an animal or other object coming near the ATM. In one case, any ongoing transaction occurring at the ATM may be cancelled, instead of generating the warnings in different fraudulent situations.

From the description provided above, it is evident that the system 102 may either operate on the binary images or the gray images for detection of fraud in the ATM. Thus, the system 102 improves utilization of the processor 110 and the memory 112 by using the binary images and the gray images, for fraud detection in the ATM.

Figure 8:
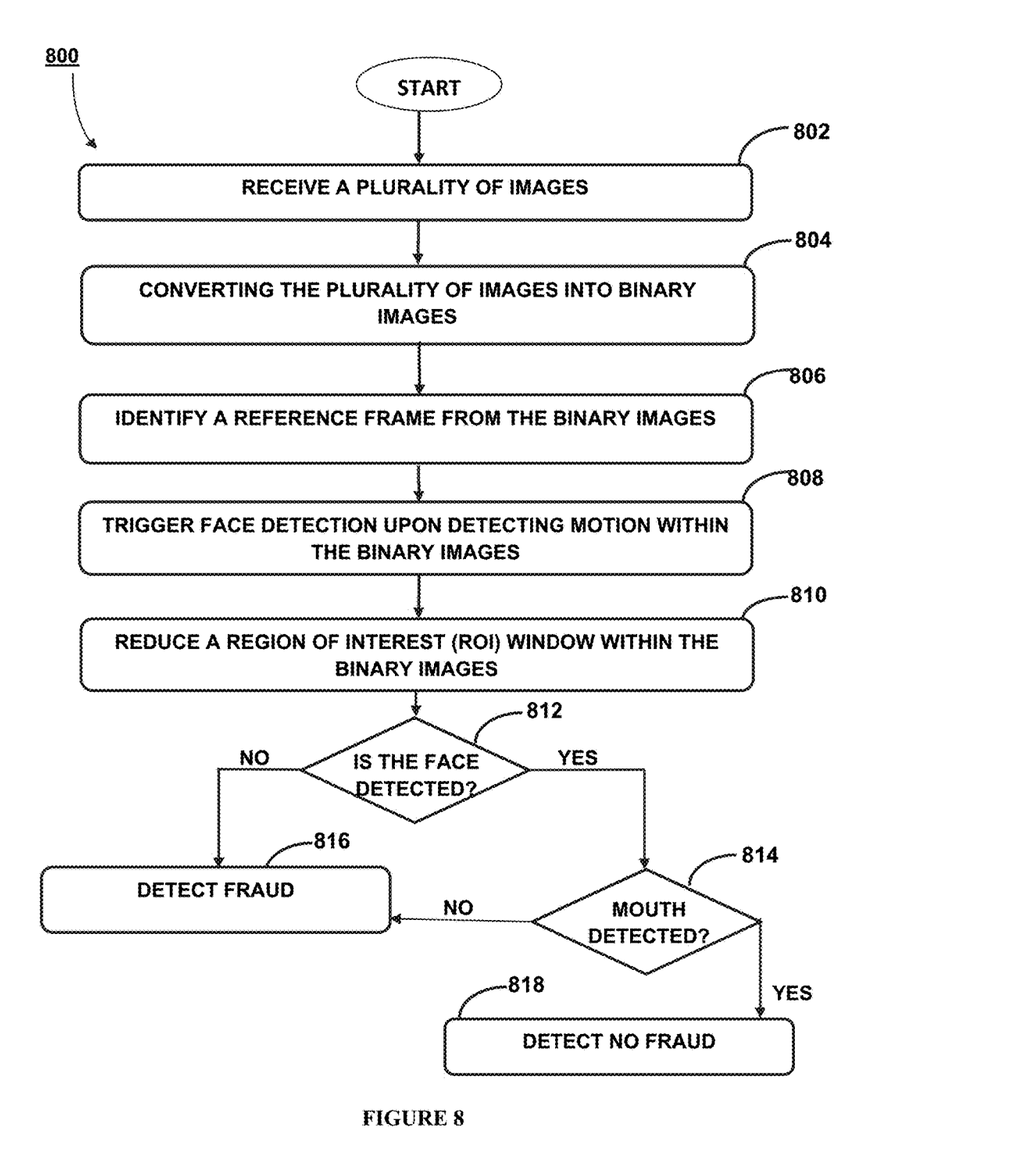
FIG. 8 shows a flowchart illustrating a method for fraud detection, by a video surveillance system, in accordance with an embodiment of the present subject matter.

Referring now to FIG. 8, a method 800 for detecting fraud by a video surveillance system is described, in accordance with an embodiment of the present subject matter. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method can be implemented in any suitable hardware, software, firmware, or combination thereof. However, for ease of explanation, in the embodiments described below, the method 800 may be considered to be implemented in the above described system 102.

At block 802, a plurality of images may be received. The plurality of images may be captured by a camera of the video surveillance system. In one implementation, the plurality of images may be received by the processor 110.

At block 804, the plurality of images may be converted into binary images. The plurality of images present at a predefined frame interval may be used for the conversion. In one implementation, the plurality of images may be converted into the binary images by the processor 110.

At block 806, a reference frame may be identified from the binary images. The reference frame may have a relative white pixel count greater than a lower predefined threshold of the white pixel count. In one implementation, the reference frame may be identified by the processor 110.

At block 808, face detection may be triggered upon detecting motion within the binary images. The motion may be detected while the relative white pixel count either exceeds an upper predefined threshold or increases monotonically. In one implementation, the face detection may be triggered by the processor 110.

At block 810, a Region of Interest (RoI) window may be reduced within the binary images, based on a highest density of white pixel count. The highest density of white pixel count may be determined by spatially sampling the binary images along columns. In one implementation, the RoI window may be reduced by the processor 110.

At block 812, it is determined whether a face is detected within the reduced RoI window. At block 814, it is determined whether a mouth is detected within a lower half of the face when the face is detected within the reduced RoI window at block 812. At block 816, the fraud is detected when the face is not detected within the reduced RoI window at block 812 and/or the mouth is not detected within the lower half of the detected face at block 814. In one implementation, the face and the mouth may be detected by the processor 110. At block 816, no fraud is detected when the mouth is detected within the lower half of the face at block 814. For example, the method 800 proposes a complete binary framework for motion detection and fraud detection through detection of face and mouth.

Although implementations for methods and systems for detecting fraud have been described in language specific to structural features and/or methods, it is to be understood that the appended claims are not necessarily limited to the specific features or methods described. Rather, the specific features and methods are disclosed as examples of implementations for detecting fraud by the video surveillance system.

Exemplary embodiments discussed above may provide certain advantages. Though not required to practice aspects of the disclosure, these advantages may include those provided by the following features.

Some embodiments may enable a system and a method to detect fraud by processing images at a low sampling rate.

Some embodiments may further enable a system and a method to detect fraud by processing either gray images or binary images.

Some embodiments may enable a system and a method to avoid false detection of fraud by detecting mouth in a lower half of face in an image.

Some embodiments may enable a system and a method to adapt to illumination changes by updating the reference frame based on changes in illumination in background of the images.

Some embodiments may enable a method to improve computational performance of a video surveillance system for fraud detection by activating the process of face detection upon detection of motion within an image.

What is claimed is:

1. A method for detecting fraud by a video surveillance system, the method comprising:
   receiving, by a processor in the video surveillance system, a plurality of images;
   converting, by the processor, the plurality of images, present at a predefined frame interval, into binary images;
   identifying, by the processor, a reference frame, from the binary images, having a relative white pixel count greater than a lower predefined threshold of the white pixel count;
   triggering, by the processor, face detection upon detecting motion within the binary images, wherein the motion is detected while the relative white pixel count either exceeds an upper predefined threshold or increases monotonically;
   reducing, by the processor, a Region of Interest (RoI) window within the binary images based on a highest density of white pixel count, wherein the highest density of white pixel count is determined by spatially sampling the binary images along columns;
   determining whether a face is detected, by the processor, within the reduced RoI window;
   determining whether mouth is detected within a lower half of the face, by the processor, when the face is detected within the reduced RoI window; and
   detecting the fraud, by the processor, when at least one of the face is not detected within the reduced RoI window and the mouth is not detected within the lower half of the detected face.

2. The method of claim 1, wherein the plurality of images are converted into the binary images using a Figure Ground Segregation (FGS) technique.

3. The method of claim 1, further comprising performing an Exclusive-OR (XOR) operation between the binary images, present at a predefined frame interval, to determine the relative white pixel count.

4. The method of claim 1, further comprising updating the reference frame based on illumination changes in the binary images.

5. The method of claim 1, further comprising spatially sampling the binary images along rows for determining the highest density of white pixel count.

6. The method of claim 1, further comprising increasing a sampling rate of the binary images upon triggering the face detection.

7. The method of claim 1, further comprising generating an alarm upon detecting the fraud by the video surveillance system.

8. The method of claim 1, further comprising using a Histogram of Oriented Gradients (HOG) technique for detecting a person within the binary images.

9. The method of claim 1, wherein the mouth is detected using a HAAR technique.

10. A video surveillance system for fraud detection, the system comprises:
    a processor;
    a memory coupled to the processor, wherein the processor is capable for executing programmed instructions stored in the memory to:
    receive a plurality of images;
    convert the plurality of images, present at a predefined frame interval, into binary images;
    identify a reference frame, from the binary images, having a relative white pixel count greater than a lower predefined threshold of the white pixel count;
    trigger face detection upon detecting motion within the binary images, wherein the motion is detected while the relative white pixel count either exceeds an upper predefined threshold or increases monotonically;
    reduce Region of Interest (RoI) window within the binary images based on a highest density of white pixel count, wherein the highest density of white pixel count is determined by spatially sampling the binary images along columns;

determine whether a face is detected within the reduced RoI window;

determine whether mouth is detected within a lower half of the face when the face is detected within the reduced RoI window; and detect the fraud when at least one of the face is not detected within the reduced RoI window and the mouth is not detected within the lower half of the detected face.

11. The system of claim 10, wherein the plurality of images are converted into the binary images using a Figure Ground Segregation (FGS) technique.

12. The system of claim 10, further comprising performing an Exclusive-OR (XOR) operation between the binary images, present at a predefined frame interval, to determine the relative white pixel count.

13. The system of claim 10, further comprising updating the reference frame based on illumination changes in the binary images.

14. The system of claim 10, further comprising spatially sampling the binary images along rows for determining the highest density of white pixel count.

15. The system of claim 10, further comprising increasing a sampling rate of the binary images upon triggering the face detection.

16. The system of claim 10, further comprising generating an alarm upon detecting the fraud by the video surveillance system.

17. The system of claim 10, further comprising detecting a person within gray images using a Histogram of Oriented Gradients (HOG) technique, wherein the person is detected upon detecting motion in the binary images.

18. The system of claim 10, wherein the mouth is detected using a HAAR technique.

19. A non-transitory computer readable medium embodying a program executable in a computing device for detecting fraud by a video surveillance system, the program comprising:

a program code for receiving a plurality of images;

a program code for converting the plurality of images, present at a predefined frame interval, into binary images;

a program code for identifying a reference frame, from the binary images, having a relative white pixel count greater than a lower predefined threshold of the white pixel count;

a program code triggering face detection upon detecting motion within the binary images, wherein the motion is detected while the relative white pixel count either exceeds an upper predefined threshold or increases monotonically;

a program code for reducing a Region of Interest (RoI) window within the binary images based on a highest density of white pixel count, wherein the highest density of white pixel count is determined by spatially sampling the binary images along columns; a program code for determining whether a face is detected within the reduced RoI window;

a program code for determining whether mouth is detected within a lower half of the face when the face is detected within the reduced RoI window; and a program code for detecting the fraud when at least one of the face is not detected within the reduced RoI window and the mouth is not detected within the lower half of the detected face.

* * * * *